United States Patent [19]

Greubel et al.

[11] 4,235,527
[45] Nov. 25, 1980

[54] DISPLAY DEVICE COMPRISING A LIGHT VALVE UNIT IN CONJUNCTION WITH THE FLUORESCENT PLATE

[75] Inventors: Waldemar Greubel; Hans Krüger, both of Munich, Fed. Rep. of Germany

[73] Assignee: Siemens Aktiengesellschaft, Berlin & Munich, Fed. Rep. of Germany

[21] Appl. No.: 14,537

[22] Filed: Feb. 23, 1979

[30] Foreign Application Priority Data

Feb. 27, 1978 [DE] Fed. Rep. of Germany ....... 2808268

[51] Int. Cl.³ .............................................. G02F 1/133
[52] U.S. Cl. ..................... 350/345; 350/334
[58] Field of Search ................................ 350/345, 334

[56] References Cited

U.S. PATENT DOCUMENTS 4,142,781  3/1979  Baur et al. ............................. 350/345

OTHER PUBLICATIONS

Bechtler et al.: "Dim Light Is No Turnoff for Fluorescence Activated LCD", Electronics, Dec. 8, 1977, pp. 113-116.

Keil: "Design Principles of Fluorescent Radiation Converters", *Nuclear Instruments and Methods*, 1970, pp. 111-123.

*Primary Examiner*—Edward S. Bauer
*Attorney, Agent, or Firm*—Hill, Van Santen, Steadman, Chiara & Simpson

[57] ABSTRACT

An improved display device having a light valve unit or display and a fluorescent plate characterized by a frame member for holding the light valve unit and fluorescent plate with the exit windows of the fluorescent plate being aligned with the switchable zones of the light valve unit. Preferably, the frame member will pass light which will excite the fluorescent particles of the fluorescent plate but will not allow passage of the fluorescent light so that a high contrast of the display can be obtained. The frame, which is preferably molded of synthetic plastic, can contain fluorescent particles, which emit light at a frequency range that does not impair the optical contrast of the display and which can be utilized to charge a battery for an auxiliary illumination device.

8 Claims, 3 Drawing Figures

U.S. Patent
Nov. 25, 1980
4,235,527
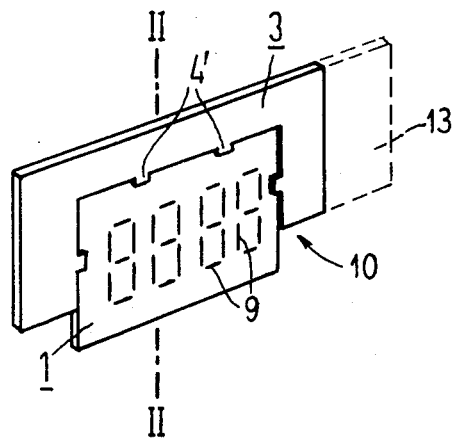
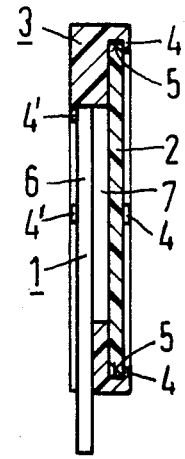
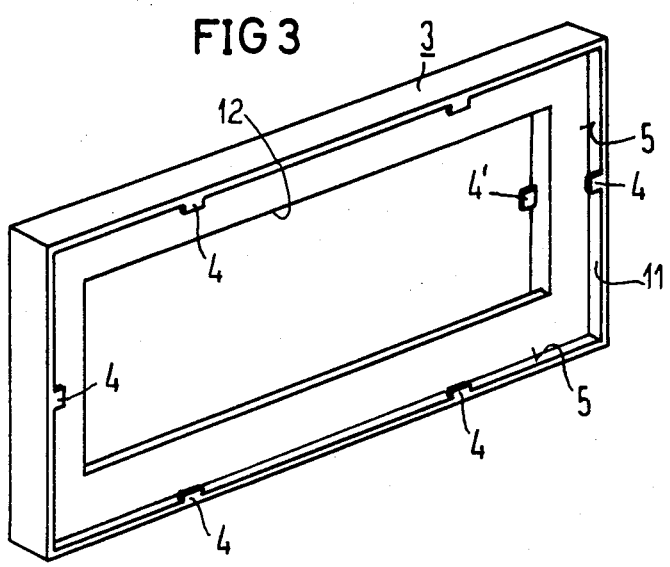

DISPLAY DEVICE COMPRISING A LIGHT VALVE UNIT IN CONJUNCTION WITH THE FLUORESCENT PLATE

BACKGROUND OF THE INVENTION

The present invention is directed to a display device which includes a light valve display or unit arranged in conjunction with a fluorescent plate which is a plate-like body containing fluorescent particles and having at least one exit window for the fluorescent light.

Displays, which utilize a light valve unit having at least one zone, which is switchable in its optical state, and a fluorescent plate comprising a plate-like body containing a fluorescent material and having at least one exit window aligned with the switchable zone are described as "fluorescent activated displays" (FLAD) and have been described in various publications, for example, in an article in *Electronics*, Dec. 8, 1977, pp. 113–116 or as described in German Offenlegungsschrift 25 54 226, whose disclosure was included in U.S. patent application Ser. No. 747,035 filed Dec. 2, 1976, which issued on Mar. 6, 1979 as U.S. Pat. No. 4,142,781.

Within the scope of the FLAD development, problems have occurred on how the light valves can be positioned and fixed in an adjusted position relative to the fluorescent plate. On occasion, the alignment process necessary for this purpose is extremely time consuming as the display zones of the light valves, which are determined by the virtually invisible electrode segments, must be aligned with the associated light outlet or exit windows of the fluorescent plate at the rear and often no reference lines are available. The cost for adjustment, which cost has hitherto been expended in producing the devices, is no longer acceptable particularly when an FLAD device is to be produced on a large scale or in mass production.

SUMMARY OF THE INVENTION

The present invention is directed to providing a remedy which enables the alignment of the exit windows of the fluorescent plate with the switchable zones of a light valve unit or device. To accomplish these tasks, the present invention is directed to a display device comprising a light valve unit having a medium which has at least one zone that can be switched between different optical states; a plate-like body being of a material having an index of refraction, which is greater than 1, and containing the fluorescent particles, said plate-like body possessing at least one light exit window and having narrow side edges; and frame means for positioning the exit windows of the plate-like body in alignment with the switchable zones of the light valve unit, said frame means being a one-piece member of a material which allows excitation light for the fluorescent particles to pass therethrough, but blocks the fluorescent light emitted by said particles, said member having surfaces engaging the narrow side edges of the plate-like body and being provided with a layer of material producing a diffused reflection layer for the engaged edges of the plate-like body. Preferably, the frame is a one-piece member molded of synthetic material and is provided with projections or tabs for engaging the plate-like body and the light valve unit for holding the unit and body in the frame.

The proposed display device offers several advantages. First, the light valve unit and the fluorescent plate are integrated with the frame to form a unit which is simple to produce and easy to assemble and in which they are supported in the correct spatial assignment so that they cannot be lost but can necessarily be detached. Moreover, the frame also serves as a contrast filter, which does not impair the reception of the fluorescent triggering radiation, but which, at the same time, does not allow passage of any of the fluorescent light so that the surface of the member or frame strongly contrasts with the color of the represented image. Finally, the frame also fulfills the function of a carrier for layers which produce a diffused reflection and which, when they are spaced from the fluorescent plate, cause a larger component of the fluorescent light to be emitted than the previously used mirror layers which were arranged directly on the fluorescent plate. The higher light yield is due to the fact that the degree of reflection in diffused reflectors can be greater than that in the case of the mirror reflectors and that diffused reflected light is primarily directed at right angles to the reflector plane and thus covers only a relatively short path with corresponding low losses before it is output coupled at the exit windows (see the article in *Nuclear Instruments and Methods*, 87 (1970), pp. 111–123). In association with the present invention it has been discovered that the required optical decoupling between the diffused reflector and the fluorescent plates by means of an air gap exists even when the reflective layer is applied to another substrate, and the substrate is then pressed against the edge of the plate.

Another advantage of the present invention is that the frame can contain a fluorescent substrate, which allows the excitation light for the fluorescent particles of the plate-like body or fluorescent plate to pass therethrough, is excited by a frequency range which preferably comprises the fluorescent light of the particles of the fluorescent plate and emits light in a frequency range which does not impair the optical contrast of the display device. The light emitted by the fluorescent substance can be directed on a photo receiver provided with the frame which photo receiver is connected to a battery and provides current to charge the battery, which battery is utilized to provide energy for an auxiliary light source in contact with the fluorescent plate.

BRIEF DESCRIPTION OF THE DRAWINGS

FIG. 1 is a perspective view of a display device in accordance with the present invention;

FIG. 2 is a cross-sectional view with portions in elevation for purposes of illustration taken along lines II—II of FIG. 1; and FIG. 3 is a perspective view of the rear of the frame in accordance with the present invention.

DESCRIPTION OF THE PREFERRED EMBODIMENTS

The principles of the present invention are particularly useful in a display generally indicated at 10 in FIG. 1. The display 10 includes a light valve unit or display 1, which may be a liquid crystal unit, a plate-like body or fluorescent plate 2 (FIG. 2) and a frame 3 which holds the liquid crystal unit 1 and fluorescent plate 2 in the desired alignment. Details of the display 10, which are not absolutely essential to enable the invention to be understood, for example details of the light valve or the fluorescent plate, have been omitted for the sake of simplicity.

As illustrated, the light valve display 1 is a liquid crystal display having a front carrier plate 6 and a rear carrier plate 7, which are joined together with a liquid crystal layer disposed therein. In the present case, the liquid crystal display operates as a so-called "twisted nematic cell" which is described in detail, for example, in German AS No. 21 58 563. The fluorescent plate 2, which, if necessary, could be covered from behind with a foil, which is transparent only for the light that will excite the fluorescent particles of the plate, collects the oncoming surrounding light by fluorescent emission and subsequent total reflection. The fluorescent radiation in the plate 2 is advanced in the interior, and finally, the fluorescent radiation is output coupled toward the light valves with an increased intensity from light outlet or exit windows which are not shown. The exit windows may be either means for coupling light out such as roughness of the surface or grooves such as disclosed and discussed in the above mentioned U.S. patent application. It should be noted that the light exit windows are aligned with the zone of the liquid crystal layer which are switched in their optical characteristics. As illustrated, the switchable zones are arranged in seven segment arrangements 9.

The frame or member 3 is designed in such a way that it keeps a liquid crystal display or unit 1 and the fluorescent plates 2 pressed against one another. It can be seen from the figures that the fluorescent plate 2 is received in a recess or aperture 11, and the rear carrier plate 7 is received in a recess or aperture 12. Both the plate 2 and plate 7 are entirely surrounded by the frame 3 on all four narrow sides or edges whereas the front carrier plate 6 of the liquid crystal display has one edge extending out of the frame which edge provides a boundary zone or contact edge on which the contact terminals (not shown) for the various electrodes are positioned. When viewed by the observer, the fluorescent plate 2 projects beyond the rear carrier plate 7 on all four sides, but the contact edge of the carrier plate 6, which edge has the contact terminals, extends beyond the edge of the plate 2.

To enable the liquid crystal display 1 and the fluorescent plate 2 to be firmly supported in the member, the frame 3 is provided with a plurality of knobs or projections 4. When the plate 2 is disposed in the frame, the projection 4 holds the plate 3 in the desired recess 11 of the frame. In a similar manner, the projections 4' will hold the liquid crystal cell 1 with the rear plate 7 in the aperture 12 and surrounded by the inner frame periphery. The front surface of the frame 3 is rendered anti-reflective by means of frosting or a surface roughening in order to eliminate disturbing reflections therefrom. The frame surfaces of the aperture 11, which surfaces face toward the narrow side edges of the plate 2 each bear a $TiO_2$ layer 5, which produces a diffused reflecting layer for each of the edges of the plate 2.

The frame 3 is produced or manufactured together with its projections 4 and 4' and its rough front surface in one single molding process. It is composed of a synthetic material provided with a dye additive, which, with regard to the surrounding light, allows the frequency range which excites the fluorescent particles of the plate 2 to pass therethrough and yet is impermeable to the frequency of the light emitted by the fluorescent particles of the plate 2. If, for example, a fluorescent substance, which is activated by blue light and is fluorescent in red light is selected for the particles for the fluorescent plate 2, the frame 3, which is adapted to the fluorescent substance, is blue whereas the fluorescent plate has a red colored tone and the represented symbols are illuminated in a strong red light.

A fluorescent substance could likewise be used as coloring agent for the frame 3. This substance will have to be such that it is not activated by the light that excites the fluorescent particles of the plate 2, does not absorb the fluorescent light produced by the particles of the plate 2, and does not produce or transmit a frequency range which would impair the representation contrast of the display. In the case of the aforementioned example using a fluorescent plate substance which can be excited by blue light and which emits red light, a suitable frame fluorescent substance would be activated by red light and be fluorescent in an infrared range. The frame of this kind provides the possibility of employing a specific component of the surrounding light to charge a battery such as a battery of an auxiliary means 13 (illustrated in broken lines in FIG. 1). The battery can be used to energize an auxiliary light source, which is utilized when the display 10 is being operated in absolute darkness. If the frame 3 is to operate in this way as a sun collector, it should be designed so that its fluorescent radiation is focused onto a photo receiver which is matched in respect to the particular frequency being emitted by the fluorescent substance.

The invention is not limited to the illustrated, exemplary embodiment. Thus, in addition to a liquid crystal display or unit, other light valve units, such as, for example, electrochrome displays or displays based on transparent ceramics can be utilized. Also, light valves which can be controlled by parameters other than electrical voltage such as, for example, by temperature changes and/or which possess only one single switchable range, are conceivable. Finally, there is considerable scope in respect of the shaping of the frame in the fulfillment in the three functions of the frame. These functions are a fixed connection between the light valve unit and the fluorescent plate, a contrast filter, and a carrier of diffused reflectors for the fluorescent plate.

Although various minor modifications may be suggested by those versed in the art, it should be understood that we wish to embody within the scope of the patent granted hereon, all such modifications as reasonably and properly come within the scope of our contribution to the art.

We claim:

1. A display device comprising a light valve unit having a medium which has at least one zone that can be switched between different optical states; a plate-like body being of a material having an index of refraction which is greater than 1 and containing fluorescent particles, said plate-like body possessing at least one light exit window and having narrow side edges; and frame means for positioning the plate-like body and light valve unit with the exit windows of the plate-like body in alignment with the switchable zones of the light valve unit, said frame means including a one-piece member of a material which allows excitation light for the fluorescent particles to pass therethrough, but blocks the fluorescent light emitted by said particles, said member having surfaces engaging the narrow side edges of the plate-like body and being provided with a layer of material producing a diffused reflection layer for the engaged edges of the plate-like body.

2. A display device according to claim 1, wherein the one-piece member is a molded component consisting of a synthetic material.

3. A display device according to claim 1, wherein the one-piece member includes projection for engaging the plate-like body and the light valve unit for holding said unit and body in the member.

4. A display device according to claim 1, wherein the front surface of the member is roughened.

5. A display device according to claim 1, wherein the light valve unit possesses a front carrier plate and a rear carrier plate which are parallel to each other, wherein the front carrier plate projects beyond the rear carrier plate along one side to form a contact edge, the plate-like body and the light valve unit being dimensioned and being arranged in the one-piece member in such a way that the plate-like body projects beyond the boundaries of the rear carrier plate on all four sides and projects beyond the front carrier plate on all three of the sides other than the contact edge and that the fluorescent plate and the rear carrier plate are enclosed on all four sides by said one-piece member whereas the front plate is only enclosed on the three sides.

6. A device according to claim 1, wherein the one-piece member contains a fluorescent substance which allows the excitation light for the fluorescent particles of the plate-like body to pass through the member, said fluorescent substance of the one-piece member being excited by a frequency range which preferably comprises the fluorescent light of said particles and emits light in a frequency range which does not impair the optical contrast of the display device.

7. A display device according to claim 6, wherein the one-piece member is provided with a photo receiver, which responds to the light emitted by the fluorescent substance of the member.

8. A display device according to claim 7, which additionally includes a battery, said photo receiver charging the battery by the current produced therein, and an auxiliary light source in contact with the fluorescent plate being energized by said battery.

* * * * *